United States Patent
Lien et al.

(10) Patent No.: US 7,541,910 B2
(45) Date of Patent: Jun. 2, 2009

(54) MULTILAYER ZINC OXIDE VARISTOR

(75) Inventors: Wei-Cheng Lien, Taipei (TW);
Cheng-Tsung Kuo, Taipei County
(TW); Jun-Nun Lin, Zhubei (TW);
Jie-An Zhu, Taipei (TW); **Li-Yun
Zhang**, Shanghai (CN)

(73) Assignee: SFI Electronics Technology Inc.,
Taoyuan County (TW)

( * ) Notice: Subject to any disclaimer, the term of this
patent is extended or adjusted under 35
U.S.C. 154(b) by 307 days.

(21) Appl. No.: 11/440,064

(22) Filed: May 25, 2006

(65) Prior Publication Data

US 2007/0273469 A1    Nov. 29, 2007

(51) Int. Cl.
*H01C 7/10*    (2006.01)
(52) U.S. Cl. .............................. 338/21; 338/20; 361/311
(58) Field of Classification Search .................... 338/21,
338/20, 13, 52, 54, 83, 223–224; 361/306.1,
361/311, 313, 322
See application file for complete search history.

(56) References Cited

U.S. PATENT DOCUMENTS

| 4,094,061 | A | 6/1978 | Gupta et al. |
| 4,127,511 | A | 11/1978 | Klein et al. |
| 4,290,041 | A | 9/1981 | Utsumi et al. |
| 4,397,775 | A | 8/1983 | Levinson |
| 4,811,164 | A | 3/1989 | Ling et al. |
| 5,115,211 | A | 5/1992 | Hara |
| 5,369,390 | A | 11/1994 | Lin et al. |
| 6,160,472 | A | 12/2000 | Arashi et al. |

*Primary Examiner*—Kyung Lee
(74) *Attorney, Agent, or Firm*—Bacon & Thomas, PLLC

(57) ABSTRACT

A multilayer zinc oxide varistor without bismuth oxide system ingredients, and having variable breakdown voltages by controlling the thickness of the ceramic material; the varistor is bismuth-free and composed of zinc oxide as the primary constituent with alkaline earth element (Ba) as first additive, at least one of transition elements of Mn, Co, Cr, or Ni as second additives, at least one of rare earth elements of Pr, La, Ce, Nd or Tb as third additives and at least one of B, Si, Se, Al, Ti, W, Sn, Sb, Na, or K as rest additives, and the bismuth-free and zinc oxide based varistor exhibits an excellent ESD (Electro-Static Discharge) withstanding characteristic.

3 Claims, 1 Drawing Sheet

MULTILAYER ZINC OXIDE VARISTOR

BACKGROUND OF THE INVENTION

1. Field of the Invention

The present invention relates to a multilayer zinc oxide (ZnO) varistor and a composition for use in the multilayer ZnO varistor, in particular, to a composition containing at least 80 mole % of ZnO and at most 20 mole % of additives for the multilayer ZnO varistor with variable breakdown voltages.

2. Description of the Prior Art

Generally speaking, a sudden surge of voltage or electric current inevitably occurs in electric or signal circuits. The source of these surges is voltage transients mainly resulting from electro-static discharge (ESD), lightening or, starting up and on/off switching operations of generators or motors. Voltage surges and disturbances can damage electric components of the electric circuits and even cause fire. Varistors, also known as surge absorbers, are normally used to protect electric circuits and electric components against spurious voltage surges and voltage transients.

Technically an electro-static discharge is defined as a transfer of electrostatic charge between two bodies at different electrostatic potentials caused by direct contact or induced by an electrostatic field. When we walk across a floor, a charge (static electricity) builds up in our body due to the friction between our shoe material and the flooring material. If we approach or touch an object with a lower electrostatic potential then the static electricity discharges from our body into the object.

Today, electronic circuits are becoming smaller and more sensitive to external interference like ESD. This invention provides multilayer chip varistor with the better ability to protect components from destructive transient over-voltage of ESD. Since ESD is a transient over-voltage generated by the friction of human body, as electronic systems become more portable, and the transient susceptibility of semiconductors increases, government regulations are essential to maintain a minimum level of performance in all equipment. Europe is so serious about the problem that they require that equipment be certified via testing to meet IEC 61000-4 series ESD test specifications after 1996.

Varistors are resistors with resistance varying with voltage with a nonlinear coefficient. Varistors have high resistance and are good resistors when loaded with voltage below the critical voltage. However, when voltages are higher than the critical voltage, the resistance of the varistor sharply decreases and the electric current through the varistor will greatly increase. That is, varistors possess the ability to adsorb surges, reduce overload voltage to a safe level and prevent electric components from being damaged by surges. Hence, varistors are called "surge absorbers" or "transient over-voltage suppressor".

The most important electric characteristic of varistors is the breakdown characteristics which can be represented in accordance with the relationship of $I=KV^{\alpha}$, wherein "I" represents the electric current through the element, "K" is a constant, "V" represents the voltage applied across the element and "$\alpha$" is a nonlinear coefficient.

The value of "V" selected to give a 1 mA current through the element is called the "breakdown voltage", abbreviated as "$V_{1\,mA}$". The greater the value of "$\alpha$", the more significant the influence of the voltage on the electric current. In other words, the greater the value of "$\alpha$", the better the voltage control characteristic, and the stronger the protecting ability of the varistor will be for the electric circuit.

Zinc oxide varistors, having an extremely high value of nonlinear coefficient and a significantly excellent surge or electric static discharge absorbing capability, are widely applied as surge absorbing elements, arresters, and voltage stabilizer elements, etc. To make compact communication equipment, the trend is to make electric components which are light weight, thin short in length, small in size, having low power consumption, and operating at low voltages. Circuit protecting devices, such as varistors, naturally should also meet the above requirements.

The breakdown voltage of zinc oxide varistors is represented by the equation of $V_{1\,mA}=V_g \cdot D/d$, wherein "D" represents the thickness of the varistor layer between two parallel internal electrodes in a varistor, "d" represents the size of a parallel grain and "$V_g$" represents the breakdown voltage per grain boundary. The "$V_g$" value of ZnO varistors is found experimentally to be about 3-4 V which is not influenced by changes in the compositions of additives or manufacture temperatures. Hence, in order to produce zinc oxide varistors with low breakdown voltage, the control of the parameters "D" and "d" are important. The grain sizes of the varistor can be controlled by varying the composition and the sintering temperature. For varistors used at low voltages, grain growth promoters such as $TiO_2$ or seeds are added into the varistor composition to promote the grain growth. However, the addition of the grain growth promoters would result in abnormal grain growth. The distribution of grain sizes is difficult to control and the surge withstanding capabilities of the varistors is reduced. Alternatively, the growth of average grain size can be achieved by increasing the sintering temperature. However, the sintering temperature has an upper limit of about 1,400° C., above which zinc oxide and additives will be evaporated and thereby, the characteristics of the varistor are lost. Hence, the lower limit of the breakdown voltage is also influenced and therefore limited.

For varistors used at low voltages, control of the parameter "D" can be achieved by reducing the varistor thickness by using any of the thin foil method, the sandwich method, the thick film method or the multilayer method.

The thin foil method utilizes conventional plate-pressing machines to produce a varistor with thickness of about 0.3 mm which is the lowest limit in this method. However, the precision of thin foil type varistors is difficult to control and the quality thereof is poor.

The sandwich method relates to addition of additives into zinc oxide single crystal chips and sintered zinc oxide polycrystal ceramic chips and then heating at high temperatures to produce sandwich type varistors. The additives will diffuse into okay ceramic chip at the high temperature. The breakdown voltage of the produced varistor is quite low; for instance, about 3 V, but the surge withstanding capability thereof is poor for practical use.

The thick film method comprises the steps of forming a slurry of zinc oxide, additives and glass; screen printing heat resistant Pt or Pd conductive gels onto alumina substrate; applying a coating of the slurry of about 100-200 μm thickness thereon; co-firing at high temperature; printing silver gel on the combination obtained above and baking to obtain thick film type varistors. Theoretically, the nonlinear coefficient "$\alpha$" of thick film varistors is only about one half that of ordinary varistors. That means, at low breakdown voltages, it has a low value of nonlinear coefficient "$\alpha$" and needs a substrate. Further, because of the comparatively poor compactness, thick film type varistors have poor surge withstanding capability.

Meanwhile, there is an accelerated trend toward smaller electronic apparatus, that is, the spread of mobile communication apparatus, which is accompanied by significant trend toward smaller electronic components and devices of various types. While this has resulted in an increased demand for smaller varistors, a reduction in the size of the varistor leads to a reduction in the effective area of the electrode thereof. For this reason, a need has arisen for varistor elements having improved ESD/surge resisting capability per unit area.

In U.S. Pat. No. 4,290,041, Utsumi et al. utilized a concept in manufacturing multilayer capacitors to produce multilayer zinc oxide varistors with variable breakdown voltages. Because Bi was known to react with many metals in preparing multiplayer ZnO varistors, glass rather than $Bi_2O_3$ was used. The Utsumi's method comprises the steps of tape casting green sheet, printing internal electrodes, laminating, cutting, sintering and applying external electrodes. Pb—B—Zn—Si (Borosilicate-lead-zinc) glass is used to replace conventional component $Bi_2O_3$ in varistor compositions. The characteristics of varistors are originated in the interface of zinc oxide and glass. In order to retard the degradation, an adequate amount of glass is generally added to manufacture zinc oxide disk-type varistors. This system due to having glass additive would have good life testing result. However, the addition of glass would reduce the surge and electric static discharge withstanding capabilities of the varistors. For this reason, glass is normally not added for disk type varistors in commercial production processes. The addition of Pb—B—Zn—Si glass to substitute $Bi_2O_3$ in varistor compositions in Utsumi's patent finally results in poor surge/ESD withstanding capability. On the other hand, the composition of pb in glass is not suit for the trend of environment request.

The present invention provides a bismuth-free ZnO based metal oxide varistor which do not content glass or bismuth but instead contain alkaline earth element Barium as primary additive to improve ESD withstanding capability of the multiplayer varistors. More specifically, the invention provides a varistor with a controllable voltage while improve its ESD withstanding ability.

SUMMARY OF THE INVENTION

The invention comprises a composition of bismuth-free ZnO based metal oxide varistor with controllable voltage. The varistor is composed of zinc oxide (ZnO) as the primary constituent, and alkaline earth element (Ba) as first additive, at least one of transition elements of Co, Mn, Cr, or Ni as second additives, at least one of rare earth elements of Pr, La, Ce, Tb, or Nd as third additives, and at least one of B, Si, Se, Al, Ti, W, Sn, Sb, Na, or K as fourth additives.

Therefore, it is an object of the present invention to provide a composition for a multilayer zinc oxide varistor, which contains no Bi system ingredients and replaced Bi by alkaline earth element barium (Ba) in order to increase the ESD withstanding capability of the varistors and to mitigate the above drawbacks.

A further object of the present invention is to provide a multilayer zinc oxide varistor with variable breakdown voltages by controlling the exact thickness of the green sheet, the height of the doctor blade and the viscosity of the slurry.

These and other objects, advantages and features of the present invention will be more fully understood and appreciated by reference to the written specification.

BRIEF DESCRIPTION OF THE DRAWINGS

The present invention will be further explained with reference to the annexed drawings, wherein.

DESCRIPTION OF THE PREFERRED EMBODIMENT

Figure 1:
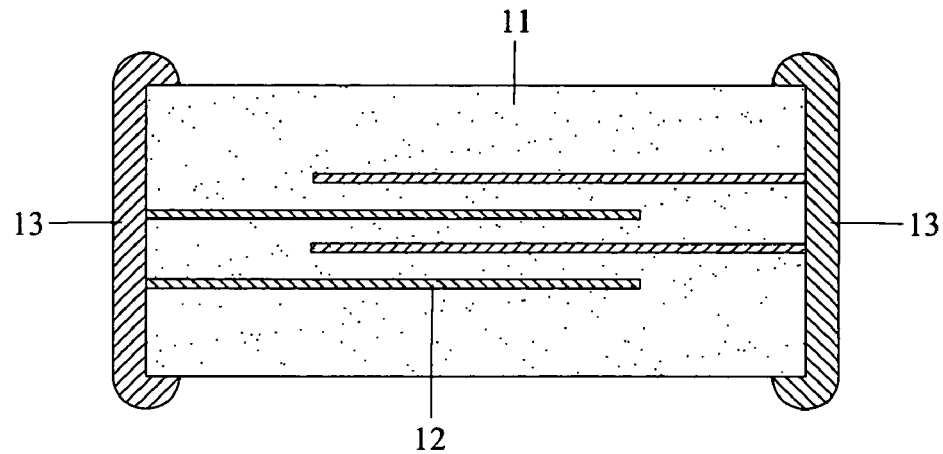
FIG. 1 is a cross-sectional view of a multilayer zinc oxide varistor of the present invention.

In accordance with the present invention, as a starting raw material, a mixture of zinc oxide (ZnO) in an amount of at least 80 mole % and an additive in an amount of at most 20 mole % is to constitute a ceramic base body in a multilayer zinc oxide varistor.

The ceramic base body of the varistor of the present invention is composed of 80~99.5 mole % of ZnO as the primary constituent with the first additive of alkaline earth element 0.01~10 mol % of Barium, the second additives contain 0.005~10 mole % of one or more transition elements of Mn, Co, Cr or Ni, the third additives contain 0.005~10 mole % of one or more rare earth elements of Pr, La, Ce, Nd, or Tb, and the fourth additives contain 0.001~5 mol % of at least one of boron, silicon, selenium, aluminum, titanium, tungsten, tin, antimony, sodium or potassium.

The additive elements may be added to the unfired varistor mixture as any convenient salt of the additive element since upon sintering, these compounds decompose into oxides of the element. Thus, Barium, which replaces bismuth as the constituent providing nonlinear varistor behavior, may be added to the unfired varistor mixture as barium oxide (BaO), barium carbonate ($BaCO_3$) or as any other convenient barium salt.

The specific function of boron in varistor may be related to temperature stability of the varistor, so its addition is found essential. Boron may be added as boric acid ($H_3BO_3$) or as boron oxide ($B_2O_3$), or instance. One or more transition element additives are necessary to provide device nonlinearity. Transition elements such as nickel, cobalt, and manganese may be added as oxides, NiO, $Co_2O_3$, and $MnO_2$, respectively. The quantity of aluminum doping provides control of lowering the clamping voltage of varistor. Aluminum may be conveniently added as aluminum nitrate ($Al(NO_3)_3$) or aluminum carbonate ($Al_2(CO_3)_3$).

According to the present invention, in the proper amount of elements based on the stoichiometric amount of the constituents is added with pulverizing media, pulverized and agitated in pure water, dehydrated and dried. Then, the raw material powders were granulated and calcined at a temperature of 600° C. to 900° C. and then, were pulverized and hydrated in pure water and dried again to provide varistor materials.

Subsequently, a multilayer zinc oxide varistor were produced from those varistor materials. Specifically, the varistor materials were combined with a binder, plasticizer and a plurality of stabilizers in predetermined amounts in an organic solvent and were mixed to produce slurries which in turn were subjected to a doctor blade process to form green sheets having a thickness having a thickness of 20~200 μm by controlling the gap of the doctor blade and the viscosity of the slurry. A patch with a definite dimension is cut from a green sheet and onto it is printed an internal electrode of which its conductive metal is selected from the group consisting of palladium, silver, platinum, gold, rhodium and an alloy of any two of these noble metals. After the conductive metal paste was screen-printed on the surface of the green sheets to form an inner electrode layers, a predetermined number of green sheets having an inner electrode layer printed thereon were stacked, and a predetermined number of green sheets on which the conductive metal layer was absent were stacked on the upper and lower sides thereof. Thereafter, the product was bonded by pressing it in a press machine to produce a press-bonded green sheet body in the form of a block having a thickness of about 0.5~3 mm. Then, the press-bonded green sheet body was cut into a chip type varistor of a predetermined size.

Next, such chip type varistor elements were placed in a baking furnace and were baked at about 850~1300° C. for 0.5~4 hours. A coating of an external electrode silver paste is applied to the two opposite edges, wherein the internal electrode edges are exposed. The resultant assembly is sintered at 600° C. to 900° C. for the reduction of the silver paste and the multilayer zinc oxide varistor is obtained.

Figure 2:
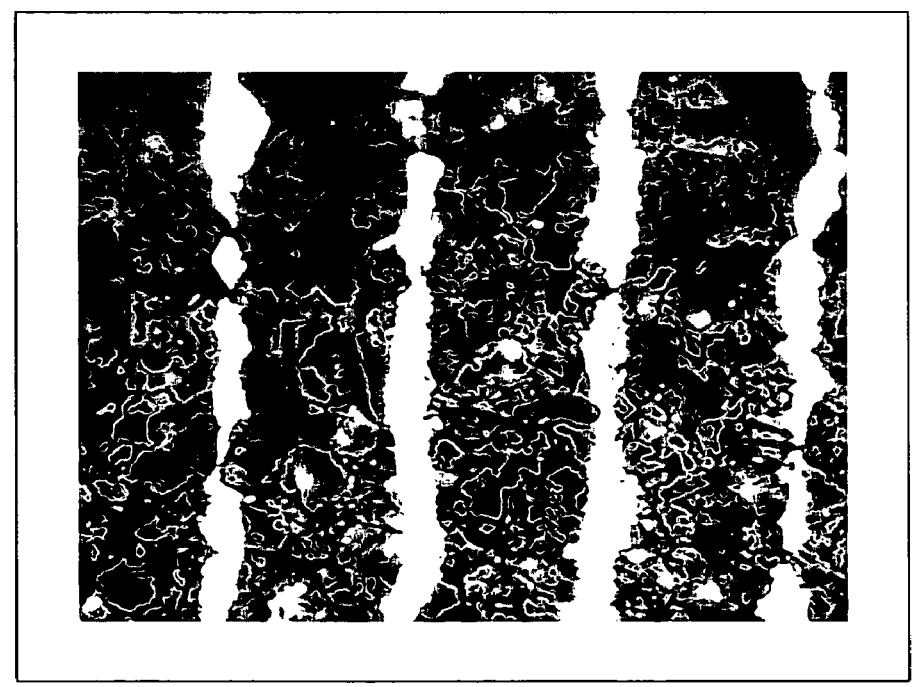
FIG. 2 is a graph showing the microscope picture of the grain structure of the multilayer varistor which is composed of zinc oxide (ZnO) as the primary constituent, and the alkaline earth element of Barium as first additive.

A cross-sectional view of the above obtained varistor is shown in FIG. 1, which is to show a multilayer zinc oxide varistor 10 of the present invention comprises a ceramic base body 11; internal electrodes 12 and terminal electrodes 13, wherein the ceramic base body 11 has a composition containing zinc oxide as a main component, and alkaline earth element barium as first additive, at least one of transition elements of Co, Mn, Cr or Ni as second additives, at least one of rare earth elements Pr, La, Ce, Nd or Tb as third additives, and at least one of B, Si, Se, Al, Ti, W, Sn, Sb, Na, or K as fourth additives. A microscope picture to shown the multilayer zinc oxide varistor 10 of the present invention having grain structure is shown in FIG. 2.

EXAMPLE

Take sample A1; sample A2; sample A3 as practical embodiments of the invention and take sample B and sample C as comparative examples, wherein the composition of the sample A1; sample A2; sample A3; sample B and sample C is shown on the Table 1 respectively.

For all the samples in Table 1, ZnO are the primary constituent, while the rest elements are all keep the same amount in these samples. That mean the samples in Table 1 have the same amount of at least one of second additives of transition elements of Mn, Co, Cr, or Ni, at least one of third additives of rare earth elements Pr, La, Ce, Tb, or Nd and fourth additives of other elements like B, Si, Se, Al, Ti, W, Sn, Sb, Na, or K.

The result of varistor voltage, α value, leakage current and ESD withstand ability of sample A1; sample A2; sample A3; sample B and sample C that use Barium/Bismuth/Pb—B—Zn—Si glass individually as first additive are also shown in Table 1.

From the Table 1 above, we know that the ESD withstanding ability for multiplayer ZnO varistor of sample A1, sample A2 or sample A3 due to using Barium element as first additive are superior to those of sample B or sample C using bismuth or Pb—B—Zn—Si glass as first additives.

Take another sample A with green sheet thickness in different size shown on Table 2 as practical embodiments of the present invention to measure the variance of the green sheet thickness with varistor voltage.

TABLE 2

| Sample Type | Sample No. | Composition | | Layer thickness (mm) | $V_{1\,mA}$ (V) | α | $I_L$ (μA) |
| | | BaO (mole %) | Glass (wt %) | | | | |
| --- | --- | --- | --- | --- | --- | --- | --- |
| A | 1 | 0.5 | 0 | 0.025 | 9.5 | 29 | 2.5 |
| A | 2 | 0.5 | 0 | 0.03 | 11.3 | 28 | 4.7 |
| A | 3 | 0.5 | 0 | 0.035 | 13.5 | 30 | 2.3 |
| A | 4 | 0.5 | 0 | 0.04 | 15.6 | 31 | 4.1 |

Table 2 shows the variance of the green sheet thickness with varistor voltage. It was found that the varistor voltage at 1 mA shall increase as the thickness of the green sheet for inner layers is increased.

From Table 1 and Table 2, we see that the invention provides a varistor with a controllable voltage while improve its ESD withstanding ability.

To sum up, varistor compositions containing alkaline earth elements instead of Bi or glass component shall have better ESD characteristic than that of Utsumi et al.'s composition system disclosed on the U.S. Pat. No. 4,290,041 which had evidenced by the examples above. In Utsumi et al.'s technique, the varistor characteristics are essentially originated at the inter-surface between zinc oxide and the added Pb—B—Zn—Si glass, but the glass added to the chip zinc oxide varistor system will reduce its ESD withstanding capability. However, the varistor characteristics of the present invention are that the composition system containing alkaline earth element Barium and no Bi is utilized to produce multilayer zinc oxide varistors with arbitrary regulated voltage.

In addition, the varistor characteristic of the invention of good ESD capability results from the inter-surface between the zinc oxide particle and the layer containing component of alkaline earth element Barium.

The multilayer zinc oxide varistor of the present invention is produced by improved technique to possess variable breakdown voltages. Furthermore, by adding a small amount of earth alkaline element, the multilayer varistors produced

TABLE 1

| Sample Type | Composition | | | | $V_{1\,mA}$ (V) | α | $I_L$ (μA) | ESD-8KV (Strike 20 times) $\Delta V/V_{1mA}$ (%) |
| | ZnO (mole %) | BaO (mole %) | $Bi_2O_3$ (mole %) | Glass (wt %) | | | | |
| --- | --- | --- | --- | --- | --- | --- | --- | --- |
| A1 | 95.5 | 0.1 | 0 | 0 | 9.4 | 26 | 3.6 | −3% |
| A2 | 95.1 | 0.5 | 0 | 0 | 9.5 | 29 | 2.5 | −2% |
| A3 | 93.1 | 2.5 | 0 | 0 | 9.7 | 25 | 3.8 | −5% |
| B | 95.1 | 0 | 0.5 | 0 | 9.3 | 26 | 6.3 | −12% |
| C | 93.6 | 0 | 0 | 2 | 9.7 | 21 | 8.8 | −14% | according to this invention have low leakage currents and good nonlinear parameter characteristics.

Of course it is understood that the above is merely a preferred embodiment of the invention and that various changes and alterations can be made without departing from the spirit and broader aspects thereof as set forth in the appended claims.

What is claimed is:

1. A multilayer zinc oxide varistor with controllable breakdown voltages comprising a ceramic base body, internal electrodes and terminal electrodes, wherein the ceramic base body has a composition of bismuth-free and Pb—B—Zn—Si glass-free ZnO based metal oxide varistor containing 80~99.5 mole % of zinc oxide as a main component, and 0.01~10 mole % of BaO or $BaCO_3$ as first additive, 0.005~10 mole % of $Co_2O_3$, $MnO_2$, $Cr_2O_3$ or NiO as second additives, 0.005~10 mole % of $Pr_2O_3$, $La_2O_3$, $Ce_2O_3$, $Nd_2O_3$ or $Tb_2O_3$ as third additives, and 0.001~5 mole % of $B_2O_3$, $SiO_2$, $SeO_2$, $Al_2O_3$, $TiO_2$, $WO_3$, $SnO_2$, $Sb_2O_3$, $Na_2O$ or $K_2O$ as fourth additives.

2. The multilayer zinc oxide varistor according to claim 1, wherein the internal electrode is made of metal selected from the group consisting of Au, Ag, Pd, Pt, Rh and an alloy of any two of the above recited metals.

3. The multilayer zinc oxide varistor according to claim 2, wherein the thickness of the ceramic body between two internal electrodes is about 20 to 200 μm.

* * * * *